Jan. 30, 1968

H. JACOBY 3,365,990

MULTIPLE-SPINDLE MACHINE TOOL

Filed Jan. 13, 1966

Inventor:
Hans Jacoby by Michael J. Striker
his Attorney

United States Patent Office 3,365,990
Patented Jan. 30, 1968

3,365,990
MULTIPLE-SPINDLE MACHINE TOOL
Hans Jacoby, Bielefeld, Germany, assignor to Werkzeugmaschinenfabrik Gildemeister & Comp., Akt.-Ges., Bielefeld, Germany
Filed Jan. 13, 1966, Ser. No. 520,342
Claims priority, application Germany, Jan. 13, 1965, W 38,340
45 Claims. (Cl. 82—29)

The present invention relates to multiple-spindle machine tools. More particularly, the invention relates to an improved system of drives which rotate the work spindles of a multiple-spindle machine tool. Still more particularly, the invention relates to improvements in multiple-spindle machine tools, particularly to automatic multiple-spindle chucking machines, wherein each work spindle may be driven at a plurality of speeds.

It is already known to provide a multiple-spindle machine with a variable-speed drive which comprises a main shaft extending axially through the indexible carrier for the work spindles and a plurality of sun gears which are mounted on the main shaft and each of which has a different diameter. Each sun gear meshes with a series of planet pinions which are mounted on the spindles, and each planet pinion may be coupled to the respective spindle by a separate clutch. Thus, by disengaging all but one of the clutches which are associated with the pinions on a given spindle, such spindle may be driven at the speed determined by that sun gear which then transmits motion through the corresponding pinion and clutch. A serious drawback of such drives is that the originally selected transmission ratios cannot be changed excepting, of course, by taking the machine apart and by replacing the sun gears and planet pinions with a different set of meshing gears. Furthermore, torque is transmitted solely by the main shaft which is normally very long so that its static and/or dynamic rigidity is unsatisfactory when the spindles are to receive very high torque. Also, and since the main shaft must carry a series of axially spaced sun gears, it must extend well beyond the carrier in which the spindles are mounted so that the machine must be provided with one or more additional bearings for the projecting end portion of the main shaft.

Accordingly, it is an important object of the present invention to provide a multiple-spindle machine tool wherein the main shaft is subjected to permissible stresses and is not likely to be flexible, twisted or otherwise deformed when in actual use, wherein that end of the main shaft which transmits torque to one or more spindles need not project (or projects only negligibly) beyond the carrier for the spindles, wherein the spindles may be driven at a large number of different speeds and may be driven in response to transmission of substantial torque which need not be transmitted by the main shaft, and wherein the spindles may be driven not only by the main shaft but also by a drive which is entirely independent of the drive including the main shaft.

Another object of the invention is to provide a machine of the just outlined characteristics wherein the spindles may be driven in different directions, wherein the spindles may be driven at any desired speed, and wherein each spindle may be driven independently of the other spindles, either in a clockwise direction or counterclockwise, and at several speeds.

A further object of the invention is to provide a multiple-spindle machine wherein all such parts which require attention and/or replacement are readily accessible, wherein the speed of the spindles may be changed while the spindles are held by the carrier in a selected angular position or while the spindles are indexed to a new position, and wherein several rugged and compact drives may be accommodated in optimum positions to be readily accessible to the operating personnel.

An additional object of the invention is to provide a machine of the above outlined characteristics which may utilize an exceptionally strong prime mover capable of transmitting to the work spindles very high driving torque and wherein each prime mover can transmit torque independently of the other prime mover or prime movers.

Still another object of the invention is to provide a very simple, compact and rugged operating system which can couple the spindles with a selected drive and which can be readily adjusted so that the machine may operate in accordance with a different setup.

A further object of the invention is to provide the machine with certain auxiliary equipment which contributes to greater versatility and utility of the machine and which enables the personnel to program the machine for any one of a large variety of turning, milling, drilling, facing and/or other machining operations.

A concomitant object of the invention is to provide an arresting unit which can arrest one or more selected spindles in accurately determined angular positions so that the spindles can be brought to a halt while the workpieces which are held thereby are oriented in an accurately determined way for transfer to the next processing station, for engagement with a specially positioned tool, or for other purposes.

An ancillary object of the invention is to provide a multiple-spindle automatic chucking machine wherein each work spindle or one or more work spindles may be coupled to the one or the other of several drives while their carrier is idle and by resorting to an extremely simple, rugged and reliable speed changing system.

Briefly stated, one feature of my invention resides in the provision of a multiple-spindle machine tool which comprises a frame, a carrier indexible in the frame about a fixed axis, an annulus of spindles rotatable in the carrier and parallel to the fixed axis, a first drive including a main shaft coaxially extending through the carrier, a first prime mover drivingly coupled to the main shaft at one axial end of the carrier, and a first set of clutches for selectively coupling the main shaft to the spindles at the other axial end of the carrier, and a second drive comprising a shaft which is coaxial with the main shaft and is located at the other axial end of the carrier, a second prime mover which is drivingly coupled to the shaft of the second drive, and a second set of clutches for selectively coupling the spindles with the shaft of the second drive at the other axial end of the carrier. Thus, the two drives are entirely independent of each other and the second drive may utilize a very short shaft which can transmit to the spindles an exceptionally high torque, i.e., the main shaft is not required to transmit high torque because, whenever the spindles meet a very strong resistance to rotation, they are coupled to the shaft of the second drive.

Certain other features of my present invention reside in special construction of prime movers for the drives, in special construction of the clutches, in special construction of means for causing the clutches to couple the spindles with the one or the other drive, and in the provision of a specially constructed arresting unit which may be utilized to arrest one or more spindles in selected angular positions and which may be combined with other components of the machine in a very simple and space-saving manner.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawings, in which:

Figure 1:
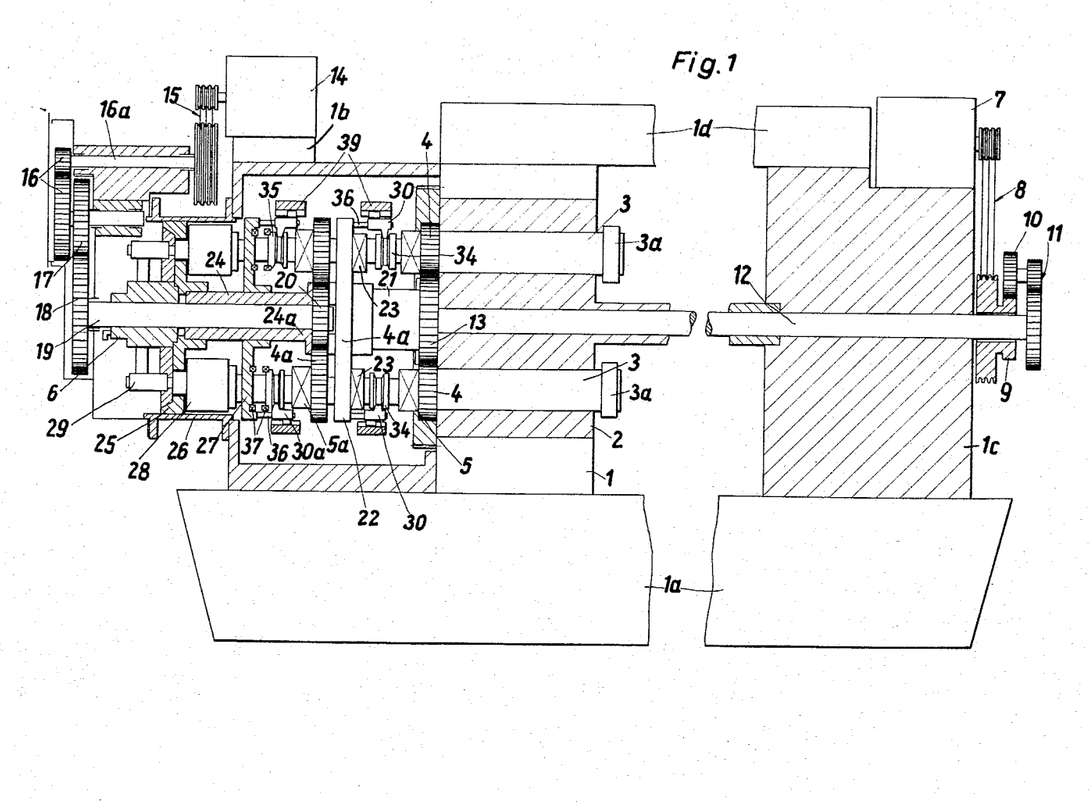
FIG. 1 is a diagrammatic side elevational view of a multiple-spindle automatic chucking machine which embodies my invention, certain parts of the machine being shown in section.

Referring to the drawings in detail, and first to FIG. 1, there is shown a multiple-spindle chucking automatic comprising a frame including a base 1a and three upwardly extending frame members or columns 1, 1b, 1c which are supported by the base 1a. The median frame member 1 supports a rotary carrier or drum 2 which is indexible about a horizontal axis and supports an annulus of equidistant work spindles 3, only two such spindles being shown in FIG. 1. Actually, the carrier is constructed to support six work spindles which are equidistant from each other and from the axis of the carrier 2. It will be noted that the axes of the spindles 2 are horizontal and are parallel with a main shaft 12 which is coaxial with the carrier 2 and forms part of a first drive serving to rotate the spindles at a first speed or at a plurality of first speeds. The mechanism for indexing the carrier 2 at predetermined intervals and through predetermined angles is not shown in the drawings; such indexing mechanism may be mounted on one of the frame members 1, 1c or on a horizontal crosshead 1d which connects the upper end portions of the frame members 1, 1c. The working station or stations of the multiple-spindle machine are located at the right-hand axial end of the carrier 2, and the right-hand end portion of each spindle carries a chuck 3a or another suitable work clamping device in which the work is held during treatment by one or more drilling, milling, turning or other tools, not shown. The chucks are preferably operated by hydraulic or pneumatic devices 28, 29 which are mounted at the left-hand ends of the respective spindles 3. The manner in which the tool or tools can treat workpieces carried by the chucks 3a is well known from the art of multiple-spindle machine tools and forms no part of my present invention.

Each spindle 3 may receive motion from two drives, always in such a way that it is disconnected from one of the drives when it receives motion from the other drive, or vice versa. The first drive includes the aforementioned main shaft 12 whose left-hand end portion extends only slightly beyond the left-hand end of the carrier 2 and is fixed to a sun gear 13. This sun gear is in permanent mesh with six planet pinions 4 each of which is rotatably mounted on one of the spindles 3. Clutches 5, also forming part of the first drive which includes the main shaft 12, are mounted on the spindles 3 and comprise axially movable clutching sleeves 34 which may couple the planet pinions 4 to or uncouple such planet pinions from the respective spindles 3. Each spindle may be coupled to or uncoupled from the respective planet pinion 4 independently of the other spindles. The second drive comprises a second shaft 19 which is coaxial with the main shaft 12 and is located at the left-hand end of the carrier 2. This second shaft 19 also carries a sun gear 20 which meshes with a second set of planet pinions 4a each of which is rotatably mounted on one of the spindles 3. The second drive further comprises a second set of clutches 5a which are mounted on the respective spindles and include axially movable clutching sleeves 35 adapted to couple or uncouple the planet pinions 4a from the corresponding spindles 3. Thus, each spindle 3 can receive motion from the planet pinion 4 or 4a, and both sets of planet pinions are located at the left-hand or rear end of the carrier 2.

The prime mover 7–11 of the first drive is mounted on the frame member 1c and includes an electric motor 7 whose output shaft drives a belt transmission 8. This transmission drives a spur gear 9 which is rotatable on the main shaft 12 and meshes with a spur gear 10 which drives one of two readily accessible change-speed gears 11. The other change-speed gear is fixed to and drives the main shaft 12. The transmission 8 may be of the infinitely variable-speed type or it may be replaced by an infinitely variable-speed transmission of any known design so that the main shaft 12 may be driven at any desired speed. Alternatively, the speed of the main shaft 12 may be changed by replacing the change-speed gears 11 with a different set of gears. Furthermore, the motor 7 may be of the variable-speed type, or it may be reversible so that the main shaft 12 can be driven in a clockwise or counterclockwise direction.

The prime mover 14–18 of the second drive includes an electric motor 14 which is mounted on the left-hand frame member 1b, a belt transmission 15 which is driven by the motor 14 and drives an intermediate shaft 16a which is parallel with the shaft 19, meshing change-speed gears 16 which are readily accessible at the left-hand end of the machine, and two spur gears 17, 18. The gear 18 is fixed to the shaft 19 and the gear 17 is driven by one of the change-speed gears 16. A shield 16b which is provided with a removable lid to afford access to the change-speed gears 16 serves to normally conceal the gear train 16–18. The shaft 19 extends through a rotary fluid distributor 6 which is connected with the fluid-operated devices 28, 29 for the chucks 3a of the individual spindles 3. Such mounting of the distributor 6 and shaft 19 contributes to greater compactness of the machine. The change-speed gears 16 may be replaced by a variable-speed of infinitely variable-speed transmission of any known design. Also, the belt transmission 15 may be of the variable-speed type. As a rule, at least one of the two drives will include an infinitely variable-speed transmission. This enables the machine to achieve constant cutting speeds in the course of a facing or similar operation by resorting to a suitable control or programming system.

As clearly shown in FIG. 1, the shaft 19 is substantially shorter than the main shaft 12. Therefore, the second drive may be utilized to transmit to the spindles 3 a very high torque.

Figure 2:
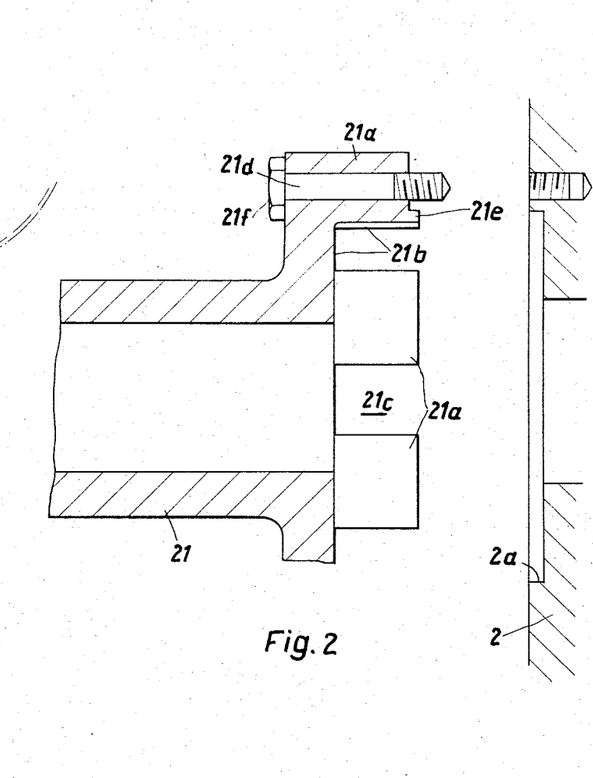
FIG. 2 is a fragmentary axial section through a bearing member which is utilized in the machine of FIG. 1 to support one end of a shaft forming part of the second drive for the work spindles.
Figure 2A:
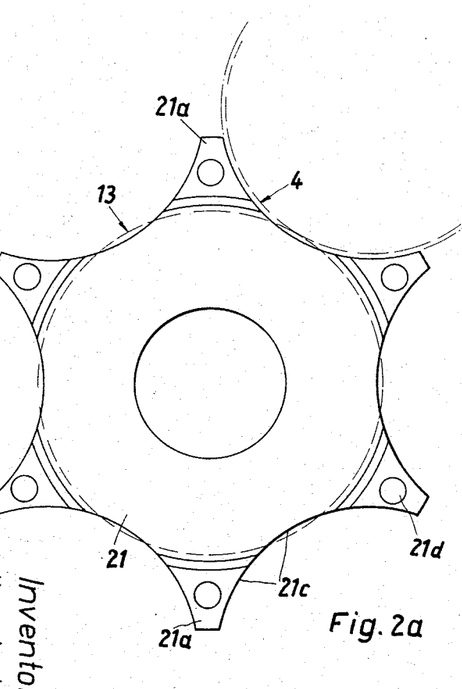
FIG. 2a is a diagrammatic end elevational view of the bearing member as seen from the right-hand side of FIG. 2.

The right-hand end portion of the shaft 19 is journalled in a bearing member 21 which comprises a bearing disk 22 and a flange 21a (see also FIGS. 2 and 2a), the latter being fixed to the left-hand end of the carrier 2 so that the bearing member 21 is compelled to share all indexing movements of the carrier. The right-hand end face of the flange 21a faces the adjoining end of the carrier 2 (see FIG. 2) and is provided with a circular recess 21b which accommodates the sun gear 13 of the main shaft 12. The flange 21a is further provided with an annulus of six additional recesses 21c each of which communicates with the central recess 21b and each of which accommodates a portion of a planet pinion 4. Each of these pinions can mesh with the sun gear 13 in a manner as shown in FIG. 2a. Such portions of the flange 21a which are disposed between the adjoining recesses 21c are provided with axially parallel bores 21d for bolts 21f or analogous fasteners by means of which the flange 21a is affixed to the left-hand end face of the carrier 2.

The flange 21a is further provided with a short centering ring 21e which is received in a circular recess 2a machined into the left-hand end face of the carrier 2.

A portion of each spindle 3 is journalled in the bearing disk 22 of the bearing member 21. Also, the bearing member 21 or its disk 22 supports six brakes 23, one for each spindle 3. The purpose of these brakes is to stop or to slow down the spindles in certain angular positions of the carrier 2, and each of these brakes may be applied or disengaged from the corresponding spindle 3 by one of the clutching sleeves 34. The exact construction of the brakes 23 forms no part of the present invention.

A median portion of the shaft 19 is journalled in a sleeve-like bearing element 24 which is indexible with the carrier 2 and is provided with a bearing disk 27. The right-hand end of the bearing element 24 is provided with a flange 24a which is analogous to the flange 21a of the bearing member 21, and the flange 24a is attached to the left-hand end of the member 21 in the same way as described in connection with FIG. 2. The left-hand end portion of the bearing element 24 is journalled in a third bearing disk 25 which is rotatable in a ring-shaped supporting member 26 attached to the frame member 1b. The aforementioned distributor 6 is also journalled in the disk 25. Each spindle 3 comprises two additional portions which are journalled in the bearing disks 27 and 25. In other words, each spindle 3 is journalled in three axially spaced bearing disks 22, 27, 25 whereby such spindles are properly supported against flexing despite the fact that they can, or actually do, extend well beyond the left-hand end of the carrier 2. The recesses on the flange 24a of the bearing element 24 accommodate the sun gear 20 and portions of the planet pinions 4a.

The motor 14 may be of the reversible type so that the second drive can rotate the spindles in a clockwise or counterclockwise direction.

Figure 3:
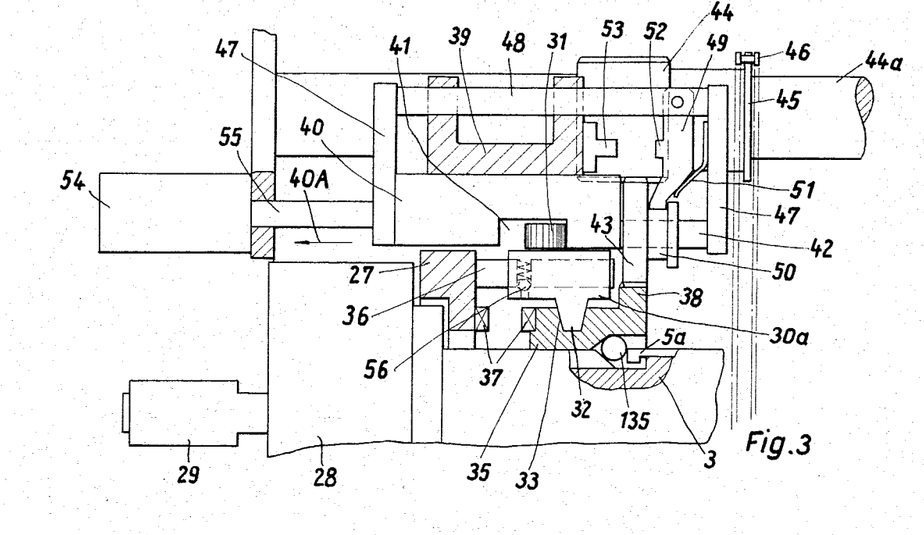
FIG. 3 is an enlarged fragmentary axial section showing a portion of an arresting unit which can stop a work spindle in one or more selected angular positions.

The manner in which a spindle may be driven by the planet pinion 4 or 4a is shown in FIGS. 1 and 3. The operating means for moving the clutching sleeves 34 and 35 axially comprises stationary cams 39 which are removably supported by the frame member 1b and form two annuli about the spindles 3. Each of these cams 39 controls an actuating member or shifter 30 or 30a whereby the shifters 30, 30a respectively control the clutching sleeves 34, 35. When the carrier 2 is indexed to a new angular position, the shifters 30, 30a engage the respective cams 39 and cause the clutching sleeves 34, 35 to couple or uncouple the spindles from the planet pinions 4, 4a and/or to apply or to disengage the brakes 23. The position of the cams 39 depends on the setup of the machine.

Each shifter 30 or 30a comprises a follower roller 31 which is arranged to track the cam face of the respective cam 39 and a projection or tooth 32 which extends into a circumferential groove 33 of the corresponding clutching sleeve 34 or 35. The shifters 30, 30a are respectively mounted on guide pins 36 provided on the bearing disks 22, 27, and each of these guide pins 36 is parallel with the spindles 3. Thus, the cams 39 can cause the shifters 30, 30a to move axially of the shaft 19 and to thereby change the condition of the respective clutches 5, 5a and brakes 23. The entire operating means occupies little room so that the improved machine may be provided with additional units which might be necessary in certain types of machining operations. For example, and as shown in FIG. 3, the machine may be provided with means for arresting each spindle 3 in one or more predetermined angular positions. Such arresting means may be associated with the clutching sleeves 34 or 35, and FIG. 3 illustrates a portion of such arresting means which is associated with the clutching sleeve 35 of a work spindle 3. In fact, the sleeve 35 forms part of the arresting means. This sleeve 35 can shift one or more balls 135 which are utilized to transmit motion to the remainder of the clutch 5a whereby the latter either connects or disconnects the planet pinion 4a from the corresponding spindle. The left-hand side of the sleeve 35 which faces the bearing disk 27 carries a single tooth 37 which can engage a single tooth 37 on the bearing disk 27. The right-hand side of the sleeve 35 carries or is integrally connected with a gear 38 which may receive motion from an auxiliary or idler drive for the spindles 3. Each such cam 39 which is provided at a station where the spindle 3 of FIG. 3 is to be arrested in a predetermined angular position is provided with an auxiliary cam 40 which resembles a cylinder and has a cutout 41 adapted to receive the follower 31 when the spindle 3 is indexed to that angular position in which the shifter 30a is adjacent to the cam 39 having an auxiliary cam 40. The cam 40 is reciprocable in the cam 39 and carries a short pin 42 for a spur gear 43 which can mesh with the gear 38 on the clutching sleeve 35 and is in permanent mesh with a spur gear 44 on a shaft 44a for a sprocket wheel 45. When the auxiliary cam 40 is not used to arrest the spindle 3 is a selected angular position, or before the cam 40 is shifted to arrest the spindle 3, its internal cam face is flush with the cam face of the cam 39 so that the two cam faces can properly guide the follower 31 and shifter 30a. The sprocket wheel 45 is driven by an endless chain 46 which is trained around a series of idler rollers or sprockets, not shown, and is driven at a constant idling speed.

The auxiliary cam 40 is provided with two arms 47 one of which is connected with the pin 42. The free ends of the two arms are connected with a guide rod 48 which is slidable in a bore provided therefor in the fixed cam 39. This guide rod 48 carries a rockable forked lever 49 which extends into a circumferential groove 50 machined into the gear 43 and is biased by a leaf spring 51 attached to the right-hand arm 47. The rod 48 not only guides the auxiliary cam 40 but also prevents rotation of this cam with reference to the cam 39. The lever 49 has a projection 52 which may be moved into and away from abutment with a stop 53 provided on the cam 39. It is to be noted that the axial length of the cutout 41 in the auxiliary cam 40 exceeds the diameter of the follower roller 31 at least by the axial length of the gear 43.

The means for reciprocating the auxiliary cam 40 comprises a hydraulic or pneumatic cylinder 54 whose piston rod 55 is secured to the left-hand arm 47. Of course, the cam 40 can also be reciprocated by a mechanical device or by an electromagnet.

The operation of the structure shown in FIG. 3 is as follows:

When the carrier 2 is indexed to a new angular position, the follower 31 of the shifter 30a enters the cutout 41 of the auxiliary cam 40 which latter is then held in its right-hand end position so that the follower 31 abuts against the left-hand surface bounding the cutout 41. During indexing, the shifter 30 of the spindle 3 shown in FIG. 3 has caused the corresponding clutching sleeve 34 to disengage the clutch 5 (i.e., to disconnect the planet pinion 4 from the spindle 3) and to apply and to again release the brake 23. In other words, the spindle has been subjected to a short-lasting braking action. In the next step, the programming unit of the machine causes the piston rod 55 of the cylinder 54 to perform a stroke in a direction to the left, as viewed in FIG. 3, whereby the auxiliary cam 40 is entrained in the direction indicated by an arrow 40A. In the first stage of such axial displacement of the cam 40, the follower 31 remains stationary because its diameter is less than the length of the cutout 41. Prior to axial movement of the cam 40 in the direction of the arrow 40A, the gear 43 is out of mesh with the gear 38 of the clutching sleeve 35 so that the latter need not participate in rotary movement of the gears 43 and 44 in response to torque transmitted by the chain 46. However, as the cam 40 moves to the left, the guide rod 48 moves therewith and the lever 49 shifts the gear 43 into mesh with the gear 38 so that the clutching sleeve 35 begins to rotate at the speed determined by the sprocket wheel 45. The spring 51 insures that the gears 38, 43 are moved into mesh without clashing. The clutching sleeve 35 thereby drives the spindle 3 at a constant idling speed. The distance between the teeth 37 decreases whereby the right-hand tooth 37 rotates at the speed of the spindle 3, i.e., at the speed determined by the chain 46. The right-hand tooth 37 ultimately engages the left-hand tooth 37 to bring the spindle 3 to a halt, but only at a time when the cam 40 has already entrained the shifter 30a through a distance which suffices to move the gear 38 out of mesh with the gear 43 whereby the spindle is disconnected from the auxiliary drive (chain 46) and is arrested in an angular position determined by the teeth 37. The movement of gear 38 out of mesh with the gear 43 takes place when the projection 52 of the lever 49 abuts against the stop 53 of the cam 39 and while the piston rod 55 continues to move in the direction indicated by the arrow 40A. The lever 49 is then rocked against the bias of the spring 51 and shifts the gear 43 along the pin 42 to move this gear axially and away from mesh with the gear 38 of the clutching sleeve 35.

The teeth 37 are preferably provided with inclined flanks to prevent clashing. Such clashing is further prevented due to the fact that the piston 54 acts not unlike a shock absorber and the piston rod 55 can yield before the right-hand tooth 37 finds its notch in the bearing disk 27. In order to temporarily hold the shifter 30a against axial movement on the guide pin 36, the structure shown in FIG. 3 preferably comprises a spring-biased detent 56 which is mounted in the pin 36 and can enter a registering groove in the shifter 30a when the latter assumes a certain axial position, namely, a position in which the clutching sleeve 35 can remain while the gear 43 moves into mesh with the gear 38. The piston rod 55 can overcome the retaining action of the detent 56 when it is caused to move in the direction indicated by the arrow 40A whereby the right-hand tooth 37 moves toward the tooth 37 on the bearing disk 27.

Of course, the auxiliary cam 40 will be returned to its starting position before the carrier 2 is indexed again to move the shifter 30a of FIG. 3 away from the cam 39.

Figure 4:
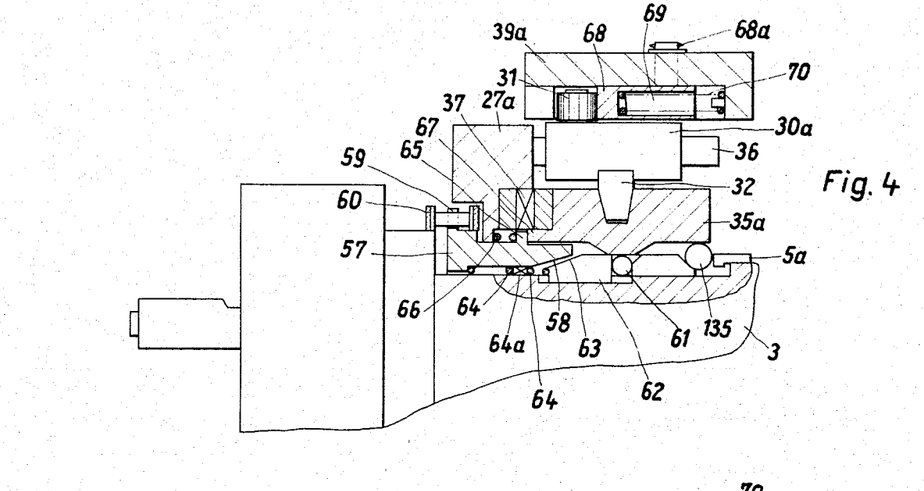
FIG. 4 is a sectional view of a modified arresting unit.
Figure 5:
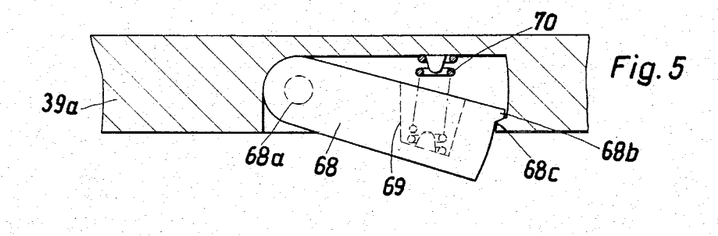
FIG. 5 is a sectional view of a detail of the structure shown in FIG. 4.

FIGS. 4 and 5 illustrate a portion of a modified arresting unit which may replace the unit of FIG. 3 and which need not be provided with a fluid-operated cylinder or analogous reciprocating means. In this unit, a spring 70 is caused to store energy during indexing of the carrier to release such energy when necessary to stop the spindle 3 in a preselected angular position. In speaking of a preselected angular position, I am referring to a position of the spindle 3 with reference to its own axis, not with reference to the common axis of the shafts 12 and 19.

The clutching sleeve 35a shown in FIG. 4 can shift one or more balls 135 to thereby cause the clutch 5a to couple or to disconnect the corresponding planet pinion 4a from the spindle 3. The machine whose arresting unit is shown in FIGS. 4 and 5 also comprises an auxiliary drive including an endless chain 60 and a sprocket wheel 57 which is rotatable on the spindle 3. The axial length of teeth 59 on the sprocket wheel 57 is considerably less than the axial length of bolts which connect the links of the chain 60 so that the sprocket wheel 57 can be shifted axially of the spindle 3 without being disengaged from the chain. The hub of the wheel 57 is provided with a conical internal surface 58 which tapers inwardly in a direction toward the chain 60. This conical surface 58 may be moved into frictional engagement with a similarly inclined conical surface 63 provided on the periphery of a ring 62 which surrounds the spindle 3 and is shiftable axially by one or more balls 61 controlled by the clutching sleeve 35a. The guide pin 36 of the shifter 30a shown in FIG. 4 is secured to a somewhat modified bearing disk 27a which again carries one of two teeth 37 serving to arrest the spindle 3 in a selected angular position. The other tooth 37 is provided on the clutching sleeve 35a.

The hub of the sprocket wheel 57 is surrounded by the adjoining portion of the bearing disk 27a. Two helical springs 64 are disposed between the sprocket wheel 57 and ring 62 to bias these parts axially and away from each other. The springs 64 are separated by an axial antifriction bearing 64a which supports the hub of the sprocket wheel 57 close to the conical surface 58. The ring 62 is movable axially on but cannot rotate with reference to the spindle 3.

The hub of the sprocket wheel 57 comprises a radially outwardly extending projection 65 which is engaged by a spring 66 bearing against the disk 27a. The projection 65 is located in the path of a stop 67 provided on the clutching sleeve 35a. The chain 60 is trained around several sprocket wheels 57 (one for each spindle 3) and is driven by a driver sprocket wheel, not shown. The driver sprocket wheel has teeth which can be bypassed by the teeth 59 of sprocket wheels 57, even when the sprocket wheels 57 are moved axially. As a rule, the axial length of the chain bolts will exceed more than twice the axial length of a tooth 59. The teeth of the sprocket wheel which drives the chain 60 engage the chain bolts at the left-hand side of the teeth 59 shown in FIG. 4. Due to the fact that the teeth 59 and the teeth of the driver sprocket wheel are very short, and also because the bolts of the chain 60 are long, the sprocket wheels 57 of the spindles 3 can bypass the driver sprocket wheel when the carrier is indexed to a different angular position.

The cam 39a comprises a rockable cam section 68 which is mounted on a pivot pin 68a and is biased by a helical expansion spring 70. A portion of the spring 70 extends into a blind bore 69 machined into the cam section 68. One end convolution of this spring bears against the cam 39a. A projecting nose 68b of the section 68 can move into abutment with a stop 68c of the cam 39a to thus limit the extent to which the section 68 can be rocked with reference to the cam.

When the carrier is indexed to a new angular position, the shifter 30a shares such movement and its roller follower 31 tracks the face of the cam section 68 whereby the projection 32 moves the clutching sleeve 35a in a direction toward the bearing disk 27a. Also, the spindle 3 is first braked and then released in a manner as outlined in connection with FIG. 3. As the sleeve 35a moves axially toward the bearing disk 27a, its ball or balls 61 shift the ring 62 so that the conical surface 63 moves into frictional engagement with the conical surface 58 of the sprocket wheel 57 which is driven by the chain 60 whereby the spindle 3 begins to rotate at a constant idling speed. It is to be recalled that the ring 62 is not rotatable on the spindle, and the same holds true for the sleeve 35a.

As the sleeve 35a continues to move in a direction to the left, as viewed in FIG. 4, the teeth 37 begin to slide with reference to each other whereby the right-hand tooth 37 rotates at the idling speed determined by the chain 60. The sleeve 35a and shifter 30a cannot move any further whereby the cam section 68 yields and the spring 70 stores energy. When the right-hand tooth 37 finds its notch in the bearing disk 27a, the spring 70 is free to release its energy and rapidly displaces the shifter 30a, sleeve 35a and right-hand tooth 37 toward the disk 27a. This causes the stop 67 to engage the projection 65 in order to shift the sprocket wheel 57 in a direction to the left whereby the conical surface 58 is disengaged from the conical surface 63 and the spindle 3 is disconnected from the chain 60. Such movement of the sprocket wheel 57 takes place against the bias of the spring 66.

A very important advantage of the arresting unit shown in FIGS. 4 and 5 is that it need not be connected to a separate source of energy. Thus, the spring 70 replaces the cylinder 54 of FIG. 3 and automatically stores energy which is necessary to couple the clutching sleeve 35a to the bearing disk 27a in a selected angular position of the spindle 3. The cam section 68 may be installed in one, two or more fixed cams 39a, depending upon whether a spindle 3 is to be held in a given angular position at the time when it assumes only one or two or more angular positions with reference to the axis of the carrier 2. Also, the cam section or sections 68 can be rapidly removed from one cam 39a or from one set of cams 39a to be installed in one or more other cams 39a so that the operators can rapidly select a different setup in which the spindles must be arrested in a different position of the carrier.

Figure 6:
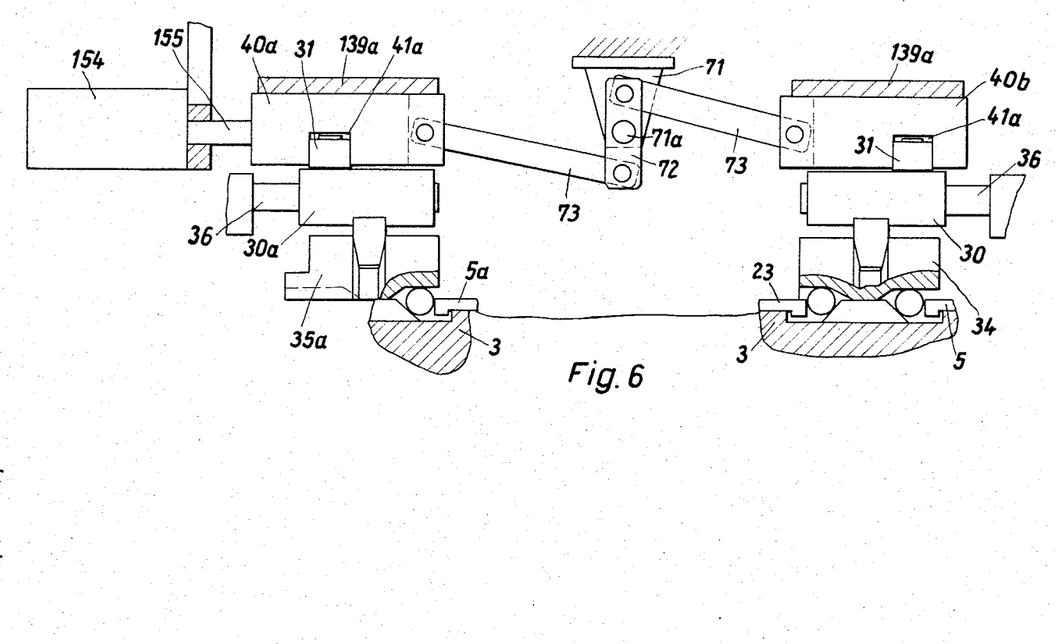
FIG. 6 is a sectional view of a system which may be utilized for changing the speed of a spindle while its carrier remains in a selected angular position, and without changing the speed of the drives.

Referring finally to FIG. 6, there is shown a system which renders it possible to change the speed of a spindle while the machine is in actual use and to bring about such change in speed by disconnecting the spindle from the first drive and by simultaneously coupling it with the second drive, or vice versa. A feature of this system is that it can bring about a change in speed while the carrier is idle, i.e., without causing the spindles to travel about the axis of the main shaft. Basically, the speed-changing system comprises an operative connection between the shifters 30, 30a which are associated with a selected work spindle 3. To this end, the cams 139a which control the shifters 30, 30a are provided with axially movable auxiliary cams 40a, 40b having cutouts 41a for the respective roller followers 31. The cams 40a, 40b can change the axial position of the respective shifters in a manner which is analogous to that described in connection with FIG. 3, and one of the cams 40a, 40b is coupled to the piston rod 155 of a fluid-operated cylinder 154. If the two clutches 5, 5a are mounted between the shifters 30, 30a, the auxiliary cams 40a, 40b are simply connected with a link (not shown) or an analogous connecting member of adjustable length. By shifting the cams 40a, 40b in a direction to the right, as viewed in FIG. 6, the link will disengage the clutch 5 and will simultaneously cause the clutch 5a to couple the planet pinion 4a (not shown in FIG. 6) to the spindle 3. By moving the cams 40a, 40b in a direction to the left, the clutch 5 will couple the planet pinion 4 (not shown) to the spindle 3 while the clutch 5a allows the planet pinion 4a to rotate with reference to the spindle.

However, and since the two clutches 5, 5a shown in FIG. 6 are located to the right of the respective sleeves 34, 35a, the connection between the auxiliary cams 40a, 40b must be such that the sleeves 34, 35a can move toward or away from each other, i.e., that the distance between the two sleeves may be changed. This is achieved by the provision of a bracket 71 which is fixed to the machine frame and carries a pivot pin 71a for a two-armed lever 72. Each end of this lever 72 is articulately connected to one of two links 73 each of which is coupled to one of the cams 40a, 40b. When the piston rod 155 causes the left-hand cam 40a to move in a direction to the right, as viewed in FIG. 6, the link train 73, 72, 73 causes the right-hand cam 40b to move in a direction to the left whereby the clutch 5a couples the pinion 4a to the spindle 3 but the clutch 5 allows the pinion 4 to rotate with reference to the spindle. The clutch 5 will be rendered active and the clutch 5a will be disengaged if the left-hand cam 40a is caused by the cylinder 154 to move in a direction to the left, as viewed in FIG. 6.

In the neutral position of the auxiliary cams 40a, 40b, their cam faces are flush with the cam faces of the cams 139a. This insures that the followers 31 will actually enter the cutouts 41a when the spindles are indexed to a new position. Prior to next indexing of the carrier, the auxiliary cams 40a, 40b are invariably returned to such neutral positions.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the following claims.

What is claimed as new and desired to be protected by Letters Patent is:

1. In a multiple-spindle machine tool, a carrier indexible about a fixed axis and having a first end and a second end; an annulus of spindles rotatable in said carrier and parallel with said axis; a first drive including a main shaft coaxially extending through said carrier, a first prime mover drivingly coupled to said main shaft at the first end of said carrier, and first clutches for selectively coupling said main shaft to said spindles at the second end of said carrier; and a second drive including a second shaft coaxial with said main shaft and located at the second end of said carrier, a second prime mover drivingly coupled to said second shaft, and second clutches for selectively coupling said second shaft with said spindles at the second end of said carrier.

2. A structure as set forth in claim 1, wherein each of said shafts comprises a sun gear located at the second end of said carrier and wherein each of said spindles carries a pair of planet pinions each meshing with one of said sun gears and each rotatable on the respective spindle, each of said clutches comprising means for coupling and uncoupling one of said pinions from the respective spindle so that each spindle may be driven by either of said sun gears.

3. A structure as set forth in claim 1, wherein each of said spindles comprises at least one fluid-operated device and further comprising a fluid distributor connected with said devices, said second shaft extending through said distributor.

4. A structure as set forth in claim 1, wherein each of said prime movers comprises a motor and wherein at least one of said drives comprises a variable-speed transmission connecting the motor with the respective shaft.

5. A structure as set forth in claim 4, further comprising a supporting frame for said carrier and said motors, said second drive further comprising a belt transmission driven by the respective motor, an intermediate shaft parallel with said second shaft and driven by said belt transmission, and a gear train including readily accessible change-speed gears for transmitting motion from said intermediate shaft to said second shaft.

6. A structure as set forth in claim 5, wherein said gear train further includes a pair of meshing spur gears one of which is fixed to said second shaft and the other of which receives motion from said change-speed gears.

7. A structure as set forth in claim 1, wherein at least one of said prime movers comprises an infinitely variable-speed transmission.

8. A structure as set forth in claim 1, further comprising a bearing member fixed to the second end of said carrier and including a bearing disk, said second shaft having an end portion journalled in said bearing member and each of said spindles having a portion journalled in said bearing disk.

9. A structure as set forth in claim 8, further comprising a brake for each of said spindles, each of said brakes being mounted on said bearing member.

10. A structure as set forth in claim 1, further comprising a bearing element rotatably supporting a median portion of said second shaft and including a first bearing disk, a fixed supporting member, and a second bearing disk rotatable in said supporting member and rotatably supporting said bearing element, said spindles having axially spaced portions journalled in said bearing disks.

11. A structure as set forth in claim 10, wherein each of said spindles comprises a fluid-operated device and further comprising a fluid distributor connected with each of said devices, said distributor being journalled in one of said bearing disks.

12. A structure as set forth in claim 1, further comprising a bearing member including a flange having an end face adjacent to the second end of said carrier, said flange having a circular recess provided in said end face and a plurality of additional recesses forming an annulus around and communicating with said circular recess, said second shaft having an end portion journalled in said bearing member.

13. A structure as set forth in claim 12, further comprising fastener means securing said flange to the second end of said carrier.

14. A structure as set forth in claim 13, wherein said fastener means comprises bolts extending through axially parallel bores provided in said flange between said additional recesses.

15. A structure as set forth in claim 12, wherein said main shaft comprises a sun gear received in said circular recess and each of said spindles carries a planet pinion extending into one of said additional recesses and meshing with said sun gear, the clutches of said first drive being arranged to couple or uncouple said planet pinions from the respective spindles.

16. A structure as set forth in claim 1, further comprising a pair of axially spaced bearing means provided at the second side of said carrier, each of said spindles extending beyond said second end and having portions journalled in said bearing means.

17. A structure as set forth in claim 16, wherein each of said clutches comprises a clutching sleeve non-rotatably mounted on and movable axially of the respective spindle, each of said sleeves having a circumferential groove and further comprising operating means for shifting said sleeves axially in response to indexing of said carrier, said operating means comprising actuating members mounted on said bearing means and having propjections extending into the grooves of the respective sleeves, and fixed cams adjacent to the path of said actuating members.

18. A structure as set forth in claim 17, wherein each of said bearing means carries a plurality of guide members parallel with said second shaft, said actuating members being reciprocably supported by said guide members.

19. A structure as set forth in claim 18, further comprising detent means for releasably holding the actuating members for the clutching sleeves of the clutches forming part of one of said drives against movement with reference to said guide means in selected positions of said actuating members.

20. A structure as set forth in claim 17, wherein each of said cams is provided with a cam face and each of said actuating members comprises a follower arranged to track the face of the respective cam in response to indexing of said carrier.

21. A structure as set forth in claim 17, further comprising arresting means for arresting at least one of said spindles in a selected angular position in response to indexing of said carrier.

22. A structure as set forth in claim 21, wherein at least one clutching sleeve on said one spindle comprises portions forming part of said arresting means.

23. A structure as set forth in claim 22, wherein said arresting means comprises a gear and a tooth provided on said one clutching sleeve, a complementary tooth provided on one of said bearing means and engageable by the tooth of said one sleeve in response to axial displacement of said one sleeve along said one spindle, an auxiliary drive for rotating said one spindle at a constant speed, and means for coupling and uncoupling the gear of said one sleeve from said auxiliary drive so that said one spindle is rotated by said auxiliary drive during movement of said one sleeve toward the complementary tooth on said one bearing means and is disengaged from said auxiliary drive when the tooth of said one sleeve engages said complementary tooth.

24. A structure as set forth in claim 23, wherein said one bearing means is a disk which is indexible with said carrier.

25. A structure as set forth in claim 23, wherein said coupling and uncoupling means comprises an auxiliary cam provided in the cam for the actuating member for said one clutching sleeve and reciprocating means for moving said auxiliary cam during intervals between indexing movements of said carrier to first connect said one sleeve with said auxiliary drive and to thereupon disconnect said one sleeve from said auxiliary drive when the tooth of said one sleeve engages said complementary tooth.

26. A structure as set forth in claim 25, wherein said reciprocating means comprises a fluid-operated cylinder indexible with said carrier and having a piston rod connected with said auxiliary cam.

27. A structure as set forth in claim 25, wherein said auxiliary drive comprises a second gear, means for driving said second gear, and a third gear meshing with said second gear, said auxiliary cam being arranged to move said third gear into and out of mesh with the gear of said one clutching sleeve.

28. A structure as set forth in claim 27, wherein said auxiliary cam comprises a pair of arms and said arresting means further comprises a guide rod connected with the arms of said auxiliary cam and slidable in the corresponding cam auxiliary of said second shaft, and a spring-biased lever rockably mounted on said guide rod and extending into a circumferential groove of said third gear.

29. A structure as set forth in claim 28, wherein said lever comprises a projection and the corresponding cam is provided with a stop for engaging said projection when the guide rod is moved by said reciprocating means to thereby disengage said third gear from the gear of said one clutching sleeve.

30. A structure as set forth in claim 27, wherein the means for driving said second gear comprises a sprocket wheel and an endless chain trained around said sprocket wheel, said third gear being in permanent mesh with said second gear.

31. A structure as set forth in claim 27, wherein each of said actuating members comprises a roller follower arranged to track the corresponding cams and wherein said auxiliary cam is provided with a cutout which receives with clearance the follower of the corresponding actuating member.

32. A structure as set forth in claim 22, wherein said arresting means comprises an auxiliary drive for rotating said spindles at a constant idling speed and including a sprocket wheel rotatably mounted on each of said spindles, a tooth provided on at least one of said clutching sleeves, a complementary tooth provided on one of said bearing means and engageable by the tooth of said one sleeve in response to axial displacement of said one sleeve, means for coupling said one sleeve with the respective sprocket wheel in response to axial displacement of said one sleeve and for uncoupling said one sleeve from the respective sprocket wheel when the tooth of said one sleeve engages the complementary tooth of said one bearing means.

33. A structure as set forth in claim 32, further comprising a projection provided on said last named sprocket wheel and a stop provided on said one sleeve, said stop being arranged to abut against said projection in response to axial movement of said one sleeve toward the respective sprocket wheel to thereby shift said wheel axially and to uncouple the wheel from said one sleeve.

34. A structure as set forth in claim 32, wherein said auxiliary drive further comprises a driven endless chain trained around said sprocket wheels, said sprocket wheels being movable axially with reference to said chain.

35. A structure as set forth in claim 32, further comprising means for storing energy during a first stage of axial movement of said one sleeve and for releasing such energy in a next stage of such axial movement to thereby move the tooth of said one sleeve into engagement with the complementary tooth of said one bearing means.

36. A structure as set forth in claim 35, wherein at least one of said cams comprises a rockable cam section and said energy storing means comprises a spring arranged to bias said cam section.

37. A structure as set forth in claim 36, further comprising means for limiting the movements of said cam section under the bias of said spring.

38. A structure as set forth in claim 32, further comprising friction clutch means having portions provided on said last named sprocket wheel and a ring provided on the spindle for said one sleeve, said ring being movable axially by said one sleeve to thereby engage said friction clutch means and to rotate said last named spindle at the speed of the respective sprocket wheel.

39. A structure as set forth in claim 38, further comprising a pair of springs disposed between said ring and the respective sprocket wheel for biasing said ring away from such sprocket wheel, and a antifriction bearing interposed between said springs.

40. A structure as set forth in claim 17, further comprising speed changing means for shifting the clutching sleeves on at least one of said spindles axially so as to disconnect said one spindle from one of said drives and to simultaneously connect said one spindle to the other drive, or vice versa.

41. A structure as set forth in claim 40, wherein said speed-changing means comprises an operative connection between the actuating members of the clutching sleeves on said one spindle and means for shifting such actuating members with reference to said one spindle.

42. A structure as set forth in claim 41, wherein said operative connection comprises means for changing the length thereof.

43. A structure as set forth in claim 41, wherein said operative connection is arranged to move the corresponding actuating members as a unit.

44. A structure as set forth in claim 41, wherein said operative connection is arranged to move the corresponding actuating members with reference to each other.

45. A structure as set forth in claim 41, wherein said shifting means comprises a fluid-operated cylinder.

References Cited

UNITED STATES PATENTS 3,292,466   12/1966   Jacoby _______________ 82—3

FOREIGN PATENTS 1,207,764   12/1965   Germany.

GERALD A. DOST, *Primary Examiner.*